(12) United States Patent
Kirii et al.

(10) Patent No.: US 6,846,473 B2
(45) Date of Patent: Jan. 25, 2005

(54) PROCESS FOR PRODUCING HEXACHLORODISILANE

(75) Inventors: Seiichi Kirii, Yokkaichi (JP); Mitsutoshi Narukawa, Yokkaichi (JP); Hisayuki Takesue, Yokkaichi (JP)

(73) Assignee: Mitsubishi Materials Polycrystalline Silicon Corporation, Yokkaichi (JP)

( * ) Notice: Subject to any disclaimer, the term of this patent is extended or adjusted under 35 U.S.C. 154(b) by 212 days.

(21) Appl. No.: 10/113,982

(22) Filed: Apr. 2, 2002

(65) Prior Publication Data

US 2003/0147798 A1 Aug. 7, 2003

Related U.S. Application Data

(63) Continuation of application No. PCT/JP01/06450, filed on Jul. 26, 2001.

(30) Foreign Application Priority Data

Aug. 2, 2000 (JP) ........................................ 2000-234621

(51) Int. Cl.[7] ............................................. C01B 33/107
(52) U.S. Cl. ........................... 423/342; 423/350; 203/29
(58) Field of Search ................................. 423/342, 348, 423/349, 350; 203/29, 31

(56) References Cited

U.S. PATENT DOCUMENTS

| 4,390,510 A | * | 6/1983 | Ritzer et al. | ................. 423/342 |
| 4,639,361 A | * | 1/1987 | Aono et al. | ................. 423/347 |
| 5,711,925 A | * | 1/1998 | Noda et al. | ................. 423/341 |
| 2002/0187096 A1 | * | 12/2002 | Kendig et al. | ............. 423/350 |

FOREIGN PATENT DOCUMENTS

| JP | 57-140309 | 8/1982 |
| JP | 59-195519 | 11/1984 |
| JP | 60-145908 | 8/1985 |
| JP | 57-140309 | 8/1987 |
| JP | 10-316413 | 12/1998 |
| JP | 11-253741 | 9/1999 |

\* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

A process for producing hexachlorodisilane comprising, condensing an exhaust gas discharged from a reactor for producing polycrystalline silicon from a chlorosilane and hydrogen to separate the hydrogen, distilling the resultant condensate to separate the unreacted chlorosilane and by-product silicon tetrachloride, and then further distilling to recover hexachlorodisilane, wherein tetrachlorodisilane can be recovered together with the hexachlorodisilane, and the hexachlorodisilane and tetrachlorodisilane recovered have a far higher purity than the conventional ones produced from metallic silicon.

24 Claims, 1 Drawing Sheet

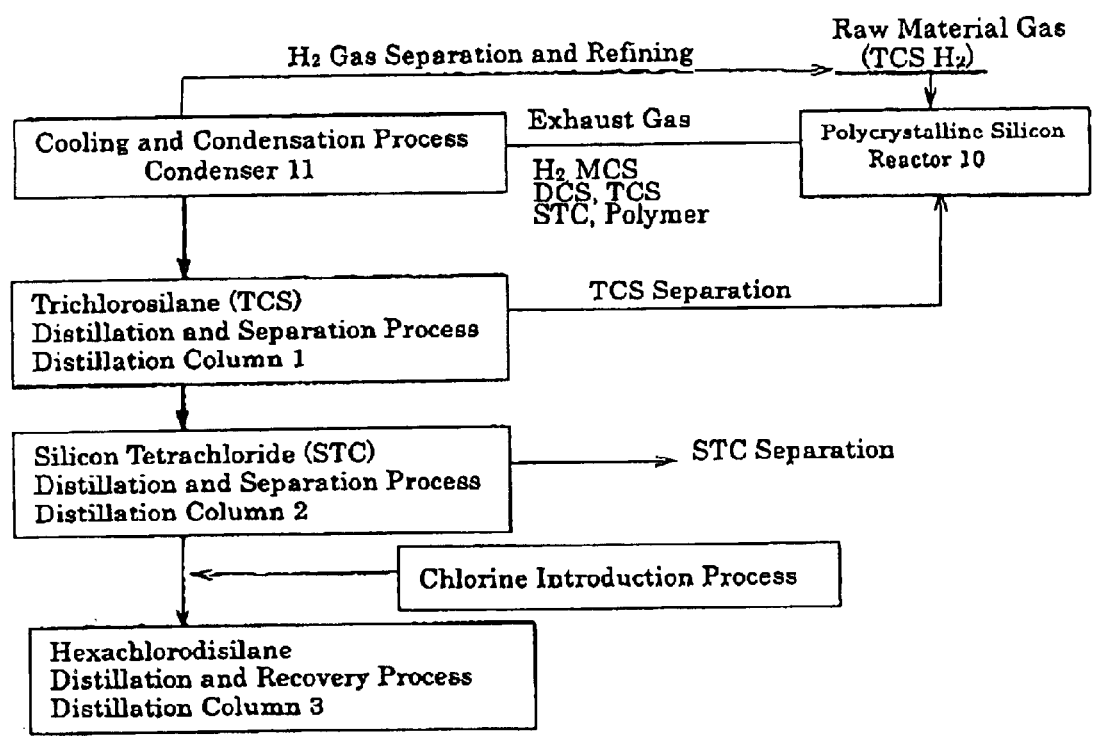
Example 3 (Step Distillation)
Cutting the initial distilled part at less than 135°C (STC mainly).
Recovering the intermediate distilled part at 135 to 149°C (Tetrachlorodisilane mainly) if necessary.
Recovering the distilled part at 149 to 150°C (Hexachlorodisilane) as the product.
Stopping the distillation at more than 150°C (Residue) : Octachlorotrisilane, Decachlorotetrasilane.

PROCESS FOR PRODUCING HEXACHLORODISILANE

BACKGROUND OF THE INVENTION

1. Field of the Invention

Present invention relates to a process for producing hexachlorodisilane ($Si_2Cl_6$), having a high purity, which can be recovered efficiently from the exhaust gas discharged from a process for producing polycrystalline silicon. Moreover, the present invention also relates to a process recovering tetrachlorodisilane ($Si_2H_2Cl_4$) together with hexachlorodisilane.

2. Discussion of the Background

Hexachlorodisilane ($Si_2Cl_6$) is useful as a raw material in the production of amorphous silicon thin films, in base glass for optical fibers, and for disilanes. The conventional method for producing hexachlorodisilane is by chlorinating an alloy powder containing silicon to form a mixed gas of a poly-chlorosilane. The mixed gas is then cooled, condensed, and distilled to separate hexachlorodisilane. (Japanese Patent Laid Open No. Syou 59-195519). In addition, hexachlorodisilane has also been produced by a process in which a ferrosilicon is reacted with chlorine gas using a stirring and mixing horizontal-type reaction tube. (Japanese Patent Laid Open No. Syou 60-14590). However, these processes use a low-grade metallic silicon as a raw material which leads to the unavoidable contamination of the hexachlorodisilane produced. Specifically, metallic impurities in low-grade silicon form contaminates in the product mixture that are difficult to separate from the desired hexachlorodisilane. This is especially true when the silicon contains titanium and aluminum impurities, since the resulting chlorides of titanium and aluminum (i.e., $TiCl_4$ and $AlCl_3$) have a boiling point that is very close to the boiling point of hexachlorodisilane. The presence of these by-products therefore usually make the recovery, by distillation, of high purity hexachlorodisilane very difficult.

SUMMARY OF THE INVENTION

The present invention provides a process that solves the problems inherent in the conventional methods for producing hexachlorodisilane, and can be used to efficiently produce hexachlorodisilane having a high purity. That is, in the process for producing polycrystalline silicon, where a raw material gas having a high purity is used, it was found that the exhaust gas from such a process contains, among other constituents, a mixture of hexachlorodisilane, unreacted hydrogen gas, trichlorosilane, and silicon tetrachloride, and that the hexachlorodisilane could be easily recovered from the exhaust gas. Furthermore, since the gaseous exhaust mixture also contains a large percentage of tetrachlorodisilane in the same way that the recovery of hexachlorodisilane is achieved.

The present invention provides a process for producing the hexachlorodisilane by any of the following methods.

[1] A process for producing hexachlorodisilane by recovery from an exhaust gas discharged from a silicon reaction system in the precipitation of polycrystalline silicon by thermal cracking or hydrogen reduction of a chlorosilane at high temperature. The recovery process, comprising; cooling the exhaust gas to make a condensate, and distilling said condensate to recover hexachlorodisilane.

[2] The process for producing hexachlorodisilane according to above-mentioned process, [1], further comprising; cooling said exhaust gas to make a condensate separated from unreacted hydrogen gas, distilling said condensate to separate unreacted chlorosilane and silicon tetrachloride by-product, and further distilling said condensate to recover hexachlorodisilane.

[3] The process for producing hexachlorodisilane according to above-mentioned process; [1], further comprising, a 1st distillation process, wherein said condensate separated from hydrogen is distilled to separate unreacted chlorosilane, a 2nd distillation process, wherein the residual liquid from said 1st distillation process is distilled to separate silicon tetrachloride, and a 3rd distillation process, wherein the residual liquid from said 2nd distillation process is distilled to separate hexachlorodisilane.

[4] The process for producing hexachlorodisilane according to above-mentioned process, [1], further comprising, a 1st distillation process, wherein said condensate separated from hydrogen is distilled to separate unreacted chlorosilane and silicon tetrachloride continuously, and a 2nd distillation process, wherein the residual liquid from said 1st distillation process is distilled to separate hexachlorodisilane.

[5] The process for producing hexachlorodisilane according to the above-mentioned process, [1], further comprising; cutting an initial part distilling at a lower temperature, and recovering the part distilling at a higher temperature, having hexachlorodisilane as a main component.

[6] The process for producing hexachlorodisilane according to the above-mentioned process; [1], further comprising, recovering an intermediate distilled part having tetrachlorodisilane as a main component, and recovering a part distilled at high temperature, having hexachlorodisilane as a main component.

[7] The process for producing hexachlorodisilane according the above-mentioned process, [1], wherein the distillation processes of the chlorosilane, silicon tetrachloride, and hexachlorodisilane are done continuously.

[8] The process for producing hexachlorodisilane according the above-mentioned process, [1], further comprising; a chlorine gas introduction process comprising the introduction of chlorine to said recovery process between the distillation processes of silicon tetrachloride and hexachlorodisilane.

[9] A process for producing hexachlorodisilane according to the above-mentioned process, [8], further comprising; introducing chlorine gas into said recovery process to advance chlorination, and thereafter degassing to remove chlorine gas remaining in the residual liquid.

[10] A process for producing hexachlorodisilane according to the above-mentioned process, [9], further comprising; introducing an inert gas into said residual liquid, and degassing said chlorine by bubbling.

[11] The process for producing hexachlorodisilane according to above-mentioned process, [8], further comprising; introducing chlorine into the residual liquid to advance chlorination after at least one of the distillation processes of the chlorosilane, silicon tetrachloride; or hexachlorodisilane; and degassing the residual chlorine.

According to the process of the present invention, the hexachlorodisilane can be recovered efficiently from the exhaust gas that is discharged from the reactor in the process for producing polycrystalline silicon from chlorosilane and hydrogen. Moreover, according to the process of the present invention, tetrachlorodisilane can be recovered with the hexachlorodisilane. In addition, since the hexachlorodisilane and tetrachlorodisilane produced by the process of the present invention are recovered from the exhaust gas of a process for producing polycrystalline silicon to be used as a semiconductor material, the hexachlorodisilane and tetrachlorodisilane produced have a far higher purity than that which is produced from low-grade metallic silicon metallic silicon of the conventional processes. Furthermore, in the treatment process of the present invention, the recovery of the hexachlorodisilane can be increased by introducing chlorine into the distillation solution to provide further chlorination. In addition, when chlorine is introduced, the formation of fine particles during distillation can be prevented by degassing the residual chlorine from the solution by the introduction of an inert gas to the distillation solution by bubbling.

BRIEF DESCRIPTION OF DRAWINGS

FIG. 1 is a flow-chart showing one example of the process of the present invention.

DETAILED DESCRIPTION OF THE PREFERRED EMBODIMENTS

Hereafter, the process of the present invention is explained in terms of the preferred embodiments contemplated by the inventors. FIG. 1 is a flow-chart showing one example of the process of the present invention. Hereafter, % is % by weight, unless it is otherwise explicitly defined. Also, distillation temperature is defined according to the inside pressure of column or the distillation process.

The process of the present invention is a process in which hexachlorodisilane can be recovered from the exhaust gas discharged in the vapor phase deposition reaction system of silicon, where polycrystalline silicon is deposited on a heated body by thermal cracking or hydrogen reduction of chlorosilane gas at high temperature. That is, the present invention is a process in which this exhaust gas is cooled to make a condensate and to separate unreacted hydrogen gas, and the resultant condensate is distilled to separate unreacted chlorosilane (i.e. trichlorosilane ($SiHCl_3$)) and silicon tetrachloride ($SiCl_4$) by-product. The condensate is then further distilled to recover hexachlorodisilane ($Si_2Cl_6$). In addition, since the exhaust gas contains a large percentage of tetrachlorodisilane ($Si_2H_2Cl_4$), this can also be recovered by the process of the present invention. Moreover, although the chlorosilane usually used as the main raw material for the production of polycrystalline silicon is trichlorosilane, dichlorosilane ($SiH_2Cl_2$), silicon tetrachloride, or a mixture of these silanes, can also be used.

In the example process shown in FIG. 1, four steps are required. First the condensation process (Condenser 11), in which the exhaust gas discharged from the reactor 10 is cooled to separate hydrogen gas is carried out. Second, the resultant condensate is distilled to separate the trichlorosilane in a 1st distillation process (Distillation column 1). Third, a 2nd distillation process (Distillation column 2) is carried out to achieve the separation of silicon tetrachloride from the condensate. And finally; hexachlorodisilane is recovered by a 3rd distillation process. In addition, the optional addition of chlorine to the mixture can be carried out between the distillation of silicon tetrachloride and the distillation of the hexachlorodisilane.

In the production of high-purity polycrystalline silicon for use in semiconductor materials, the Seimens method has been commonly used in the art. One example of this process is that which employs a gaseous mixture of trichlorosilane and hydrogen as raw materials to be fed into a reaction furnace at high temperature. Silicon crystals are formed by the thermal cracking and hydrogen reduction of the raw material gas and are subsequently deposited on the surface of a heated silicon seed-stick (heated from about 800 to 1200° C.) that is placed inside of the reactor. This process results in the growth of a polycrystalline silicon rod having a gradually increasing radius.

In this process, the deposited silicon is formed mainly by hydrogen reduction ($SiHCl_3+H_2 \rightarrow Si+3HCl$) and the thermal cracking ($4SiHCl_3 \rightarrow Si+3SiCl_4+2H_2$) reaction of trichlorosilane. However, since the thermal cracking reaction is fast, reactive to hydrogen reduction, a large amount of the by, product silicon tetrachloride is, produced. The exhaust gas therefore contains a large amount of silicon tetrachloride gas together with unreacted hydrogen and trichlorosilane gas. Furthermore, the exhaust gas may also contain monochlorosilane ($SiH_3Cl$), dichlorosilane ($SiH_2Cl_2$), and silicon chloride polymer, which are produced as by-products under the high temperature reaction conditions.

In the process of the present invention, the exhaust gas containing the desired product, chlorosilane, silicon tetrachloride, and unreacted hydrogen is used as the raw material. First, this exhaust gas is fed into a condenser (Condenser 11) where is it cooled to a temperature of about −60° C., preferably −65° C. to −55° C. At this point, unreacted hydrogen, which remains in the gas state at this temperature, is separated, and the other gas components remain in the condensate. The recovered hydrogen gas is refined and returned to the silicon reactor, and thus reused as part of the raw material gas.

The-above-mentioned condensate contains, chlorosilane, such as trichlorosilane, monochlorosilane or dichlorosilane, silicon tetrachloride, and the polymer comprising other silicon-chloride compounds. This condensate is fed into the first distillation process (Distillation column 1), the temperature at the top of the column is set to the distillation temperature of trichlorosilane, and trichlorosilane is recovered by distillation. The distillation temperature is set in the range of more than the boiling point of trichlorosilane to less than that of silicon tetrachloride, preferably from 33° C. to 55° C., at a pressure of 0 to 0.1 MPaG.

The recovered trichlorosilane is then returned to the reactor 10 and reused as part of the raw material for producing the polycrystalline silicon material. In addition, monochlorosilane, which has a boiling point of about −30°

C.; and dichlorosilane, which has a boiling point of about 8.29° C., distill before trichlorosilane. Therefore, monochlorosilane and dichlorosilane can be separated from trichlorosilane by recovery prior to the distillation of trichlorosilane. Monochlorosilane and dichlorosilane can thus be recovered in a highly purified state, and can thus be used as raw materials in the production of metallic silicon or amorphous silicon for electronic materials. Moreover, since the boiling point of silicon tetrachloride, which is about 58° C., is higher than that of these chlorosilanes, the silicon tetrachloride is discharged from the bottom of column in this distillation process.

Next, the liquid discharged from the first distillation process (Distillation column 1) is fed into the next distillation step (Distillation column 2). In this, the 2nd, distillation step, the temperature at the top of the column is set to the distillation temperature of silicon tetrachloride. The distillation temperature is set in the range from more than the boiling point of silicon tetrachloride to less than that of hexachlorodisilane, for example; 57° C. to 80° C. at a pressure of 0 to 0.1 MPaG. In this distillation process, while silicon tetrachloride is distilled, a mixture containing elements having higher boiling points remains in the condensate. The recovered silicon tetrachloride can be reused as a raw material for trichlorosilane.

In the example of the process shown in FIG. 1, the three distillation processes are carried out independently by a series of distillation columns (i.e., the 1st distillation process, where the condensate separated from hydrogen gas is distilled to separate the unreacted chlorosilane, the 2nd distillation process, where the residual liquid of the 1st distillation process is distilled to separate silicon tetrachloride, and the 3rd distillation process, where the residual liquid of the 2nd distillation process is distilled to separate the hexachlorodisiliane). However, is is also possible to carry out the process so that the 1st distillation process and te 2nd distillation process are combined and the unreacted chlorosilane and silicon tetrachloride are distilled continuously. After which, the residual liquid of this distillation process is distilled to recover the hexachlorodisilane.

The liquid discharged from the disillation process of silicon tetrachloride (Distillation coulumn 2) is then fed into the distillation process of the hexachlorodisilane (Distillation column 3). The temperature at the top of the column is set to the distillation temperature of hexachlorodisilane. The distillation temperature thus is set in the range from more than the boiling point of hexachlorodisilane to less than that of thr elements having higher boiling points, preferably 144° C. to 165° C. at a pressure of 0 to 0.1 MPag. At this time, the initially distilling part, which has a distillation temperature below that of hexachlorodisilane and which may contain residual silicon tetrachloride, is cut. Also, as the distillation temperature is raised, since tetrachlorodislane ($Si_2H_2Cl_4$), which has a boiling point of about 135° C to 140 ° C., distills at a tempeature higher than does silicon tetrachloride but lower than hexachlorodisilane, the intermediate distilling part is cut or recovered. Furthermore, when the distillation temperature reaches the boiling point of hexachlorodisilane, about 144° C., hexachlorodisilane of high purity can be distilled and recovered.

For example, the part distilling at less than 135° C. contains silicon tetrachloride, the intermediate part distilling at 135° C. to 149° C. contains tetrachlorodisilane, and the part distilling part at 149–150° C. contains the hexachlorodisilane. When the distillation temperature is more than 150° C., compounds other than hexachlorodisilane, having higher boiling point, are distilled. Therefore, the distillation is stopped before distillation of these higher boiling constituents occurs. In addition, the hexachlorodisilane distillation process (Distillation column 3) can also be achieved in a continuous distillation process.

In the above-mentioned process, chlorine can be introduced between the distillation of silicon tetrachloride and the distillation of hexachlorodisilane. In this process, chlorine gas is added to the residual liquid discharged from the distillation of silicon tetrachloride to cause further chlorination, thus increasing the yield of the hexachlorodisilane. Preferably, in the process of the present invention, the amount of chlorine introduced to the system is about 5–10% of the amount of the residual liquid discharged after the distillation of silicon tetrachloride. Moreover, it is also preferred that the chlorine introduction process is carried out not only between the distillation of silicon tetrachloride and the distillation of the hexachlorodisilane, but also between the distillation process of trichlorosilane and that of silicon tetrachloride. In any case, the yield of the hexachlorodisilane can be increased by this procedure.

As mentioned above, the yield of hexachlorodisilane can be raised by adding chlorine to the residual liquid after distillation to cause further chlorination. However during the distillation steps, any residual chlorine that remains in the liquid may react with the distillation component to produce a powder during the distillation. This powder adheres the inside of the distillation system forming a crust which can interfere with the distillation. For example, the liquid and gas may not flow easily, and the distillation can become unstable since a display error on the flow meter occurs. Moreover, the purity of hexachlorodisilane is reduced since this powder can become mixed in with the distilled hexachlorodisilane. Therefore, when chlorine gas is introduced into the residual liquid after distillation to further the chlorination, it is preferred that the remaining chlorine is purged from the system by degassing prior to further distillation. The process of purging the system of chlorine gas comprises introducing an inert gas, such as nitrogen or argon, into the residual liquid, followed by vacuum heating. It is preferred that the amount of the inert gas introduced into the system is about 3 times the amount of the chlorine gas previously introduced.

The chlorine introduction and the degassing of the residual chlorine can be done between arbitrary distillation processes or during the distillation processes, and it is acceptable for these processes to be carried out in stages. Moreover, it is also possible for the degassing process of the residual chlorine to be carried out continuously after introducing the chlorine, or during the next distillation process. That is, after any one of the distillation processes of the chlorosilane, silicon tetrachloride, and hexachlorodisilane, chlorine can be introduced into the residual liquid to advance chlorination. The residual chlorine is then purged and the residual liquid is fed into the next distillation process. In another possible embodiment, after chlorine is introduced into the residual liquid to further the chlorination, this residual liquid is fed into the next distillation process prior to degassing the chlorine.

In the example process shown in FIG. 1, the distillation of trichlorosilane (Distillation column 1), the distillation of silicon tetrachloride (Distillation column 2), and the distillation of hexachlorodisilane (Distillation column 3), are carried out continuously by each distillation column 1, 2, and 3. However, the process of the present invention is not limited to such a process. It is also possible for the distillations corresponding to the distillation columns 1 and 2 or 2 and 3 to be carried out in the same distillation column by controlling the distillation temperature.

According to the process of the present invention, hexachlorodisilane can be recovered easily with high yield from the exhaust gas discharged from the reactor for producing polycrystalline silicon produced from chlorosilane and hydrogen as the raw materials. Previously, the process of the present invention, in which hexachlorodisilane is recovered from said exhaust gas, was not known. Moreover, according to the present invention, tetrachlorodisilane can be recovered together with the hexachlorodisilane. Furthermore, the hexachlorodisilane and tetrachlorodisilane recovered by the process of the present invention, are recovered from the reaction exhaust gas of polycrystalline silicon used as the semiconductor material, so that these products produced by the process of the present invention, have a far higher purity than that which is produced from metallic silicon. In addition, the recovery yield of the hexachlorodisilane can be increased by introducing chlorine into the distillation solution to further chlorination. Also, the generation of fire particles due to the presense of chlorine during distillation can be prevented by degassing the residual chlorine from the solution.

Hereafter, the present invention is explained in the following examples.

EXAMPLE 1

In the reaction system, where the polycrystalline silicon was deposited on the surface of the heated body at about 1000° C. in the reactor 10, where the mixed gas of trichlorosilane and hydrogen was sealed, by thermal cracking and hydrogen reduction. In this reaction system, as shown in FIG. 1, the exhaust gas (6910 Nm$^3$/hr) discharged from the reactor 10 was introduced into condenser 11 to be cooled until −55° C. While the uncondensed hydrogen gas was recovered to be sent to the reactor 10, the condensed water (4.2 m$^3$/hr) was fed into distillation column 1, and the distillation temperature was set to 52° C. at 0.1 MPaG. Then, the distilled part (3.7 T/hr) was recovered. When this distilled part is analyzed by a gas chromatography, the amount of trichlorosilane is 97.1%, wherein the other is dichlorosilane.

Next, the residual liquid of distillation column 1 was fed into distillation column 2, and the temperature at the top of the column was set to 79° C. at 0.1 MPaG to recover the distilled part, which is 1.9 T/hr. When this distilled part was analyzed by the gas chromatography, the amount of silicon tetrachloride was 99.3%, wherein the other is trichlorosilane.

Then, the residual liquid discharged from distillation column 2, called the preparation liquid, was fed into distillation column 3, without introducing chlorine gas, to be distilled after setting the temperature at the top of the column of 150° C. First, the initially distilled part at the distillation temperature of less than 31° C. to 135° C., was separated, and the part distilling at the distillation temperature from 135° C. to 149° C., which is the intermediate distilling part, was further separated. After that, the part distilling at the distillation temperature from 149° C. to 150° C., which is the product, was recovered. The distillation component at the distillation temperature of more than 150° C., was cut as the residue. The recovered gas component was analyzed by the gas chromatography, and these results were shown in Table 1 with the recovered amounts. Moreover, as contrasted with this, the component of the preparation liquid was shown in Table 1. As shown in these results, according to the present invention, the hexachlorodisilane was recovered 19% of the amount of the preparation liquid.

EXAMPLE 2

The distillation was carried out according to Example 1, with the exception that chlorine gas (4.2 kg) was introduced into the preparation liquid (77.1 kg). This result is shown in Table 1. According to the present process, hexachlorodisilane was recovered 79% to the amount of the preparation liquid.

TABLE 1

| Component | Preparation liquid | Example 1 (Preparation Liquid 59.0 kg) | | | | Example 2 Preparation Liquid 77.1 kg + Chlorine 4.2 kg) | | | |
|---|---|---|---|---|---|---|---|---|---|
| | | Initial | Intermediate | Product | Residue | Initial | Intermediate | Product | Residue |
| SiCl$_4$ | 66.4% | 35.0 | — | — | — | 48.4 | — | — | — |
| Si$_2$H$_2$Cl$_4$ | 14.6% | — | 11.5 | — | — | — | 4.0 | — | — |
| Si$_2$Cl$_6$ | 14.2% | — | — | 1.6 | — | — | — | 8.7 | — |
| Others | 4.8% | — | — | — | 10.7 | — | — | — | 19.8 |
| Remarks | | Si$_2$Cl$_6$ Recovery Rate 19% | | | | Si$_2$Cl$_6$ Recovery Rate 79% | | | |

(Note)
Initial is the amount of the cut initial distilled part.
Intermediate is the amount of the intermediate distilled part.
Product is the amount of the part of the recovered hexachlorodisilane. Unit is kg.
Residue is the amount of the part after distillation.
Intermediate of Example 1 contains Si$_2$Cl$_6$ of 6.7 kg.
Intermediate of Example 2 contains Si$_2$Cl$_6$ of 2.2 kg.

EXAMPLE 3

An undiluted solution of the hexachlorodisilane made by the process of the present invention, was fed into distillation column 3 to be refined, in which said undiluted solution contained the polymer discharged from the distillation column 2. The impurities that are contained in the refined hexachlorodisilane are shown in Table 2. On the other hand, as a reference example, the undiluted solution of hexachlorodisilane made by using metallic silicon as the raw material, was fed into distillation column 3 to be refined according to the conventional method. The amount of impurities contained in this sample are shown in Table 2, in contrasted to Example 3. As shown in these results, the hexachlorodisilane made by the process of the present invention has far fewer impurities than that of the conventional process, and the product having a high purity can be obtained.

TABLE 2

|    | Present Invention Product | Reference Product |
|----|---------------------------|-------------------|
| Na | <100 ppbw                 | 2000 ppbw         |
| Al | <50 ppbw                  | 4000 ppbw         |
| K  | <10 ppbw                  | 70000 ppbw        |
| Ca | <10 ppbw                  | 1000 ppbw         |
| Ti | <50 ppbw                  | 600000 ppbw       |
| Cr | <10 ppbw                  | 500 ppbw          |
| Fe | <10 ppbw                  | 3000 ppbw         |
| Ni | <10 ppbw                  | 2000 ppbw         |
| Cu | <10 ppbw                  | 800 ppbw          |

(Note) Reference Product is hexachlorodisilane made by the conventional process using the metallic silicon as the raw material.

EXAMPLE 4

In the distillation process similar to Example 1, the preparation liquid was set to 75.5 kg, and chlorine gas (4.1 kg) was introduced into the residual liquid discharged from the distillation process of silicon tetrachloride to further the chlorination. After that, nitrogen gas was introduced for 197 minutes by the flow rate of 50 L/min, and bubbled to remove chlorine in the liquid. This solution done by the degassing process is fed into the distillation distillation were measured with a particle counter. This result is shown in Table 3. On the other hand, in the distillation process similar to this example, the preparation liquid was set to 77.1 kg and chlorine gas (4.2 kg) was introduced into the residual liquid discharged from the distillation process of silicon tetrachloride to further chlorination. In this example, the degassing by nitrogen gas was not done and this solution was fed directly into the distillation column of the hexachlorodisilane, and the unwanted powder impurities formed during the distillation were measured with a particle counter. This result is shown in Table 3 as the reference example.

As shown in Example 2, by introducing chlorine into the distillation solution to advance chlorination, the yield of hexachlorodisilane can be raised remarkably. However, as shown in Table 3 of this example, by doing the degassing process after introducing the chlorine, the generation of fine particle impurities during the distillation can be prevented. In the solution, where the degassing process was not done after introducing the chlorine, a lot of fine particles having a size of less than 5 $\mu$m were generated.

TABLE 3

| Powder Size, $\mu$m | With Chlorine Degassing Process | Without Chlorine Degassing Process |
|---|---|---|
| 10~100 | Less than 1 Particle/cm$^3$ | 2 Particles/cm$^3$ |
| 5~10   | Less than 1 Particle/cm$^3$ | 690 Particles/cm$^3$ |
| 3~5    | Less than 1 Particle/cm$^3$ | More than 800 Particles/cm$^3$ |
| 2~3    | Less than 1 Particle/cm$^3$ | More than 800 Particles/cm$^3$ |

Applicants hereby incorporate by reference any document cited in the Specifically, Applicants incorporate by reference priority document PCT application PCT/JP01/06450 filed on Feb. 2, 2002, and Japanesse patent application JP 2000-234621 filed on Aug. 2, 2000.

Obviously, numerous modifications and variations of the present invention are possible in light of the above teachings. Therefore, it is to be understood that within the scope of the appended claims, the invention may be practiced by methods other than those specifically described herein.

What is claimed is:

1. A process for producing hexachlorodisilane, which comprises:

discharging an exhaust gas from a polycrystalline silicon reactor in which a polycrystalline silicon is produced by thermal cracking and hydrogen reduction of trichlorosilane; wherein the exhaust gas comprises hydrogen, monochlorosilane, dichlorosilane, trichlorosilane, tetrachlorosilane, and silicone chloride polymer comprising tetrachlorodisilane, hexachlorodisilane, octachlorotrisilane, and decachlorotetrasilane;

cooling the exhaust gas in a condenser; wherein said cooling results in the separation of the hydrogen from a condensate comprising at least one chlorosilane; and subsequently distilling said condensate to obtain a liquid comprising hexachlorodisilane.

2. A process of claim 1, wherein said distilling comprises
    (i) distilling said condensate in a first distillation column to obtain trichlorosilane and a first residual liquid, and
    (ii) distilling the first residual liquid in a second distillation column to obtain hexachlorodisilane.

3. A process of claim 1, wherein said distilling comprises
    (i) distilling said condensate in a first distillation column to first obtain trichlorosilane and then tetrachlorosilane and a second residual liquid; and further
    (ii) distilling the second residual liquid in a second distillation column.

4. A process of claim 1, wherein said distilling comprises:
    (i) distilling said condensate in a first distillation column to obtain trichlorosilane and a first residual liquid; and
    (ii) distilling the first residual liquid in a second distillation column to obtain tetrachlorosilane and a second residual liquid; and (iii) distilling the second residual liquid in a third distillation column to obtain hexachlorodisilane and a third residual liquid.

5. A process as claimed in any one of claims 1–4, which further comprises:

separating and recovering monochlorosilane and dichlorosilane.

6. A process as claimed in any one of claims 1–4, wherein the distilling step to obtain the hexachlorodisilane comprises:

collecting and removing an initial distillate; and recovering a main distillate comprising hexachlorodisilane as a main component.

7. A process as claimed in any one of claims 1–4, wherein the distilling step to obtain the hexachlorodisilane comprises:

collecting and removing an initial distillate;

recovering an intermediate distillate comprising tetrachlorodisilane as a main component; and recovering a main distillate comprising hexachlorodisilane as a main component.

8. A process as claimed in claim 6, wherein said recovering a main distillate occurs at a temperature of from 149° C. to 150° C.

9. A process as claimed in claim 7, wherein said recovering a main distillate occurs at a temperature of from 149° C. to 150° C.

10. A process as claimed in claim 2, which further comprises:

introducing chlorine gas simultaneous or subsequent to step (i).

11. A process as claimed in claim 3, which further comprises:

introducing chlorine gas simultaneous or subsequent to at least one of steps (i) or (ii).

12. A process of claim 4, which further comprises:

introducing chlorine gas simultaneous or subsequent to at least one of steps (i), (ii), or (iii).

13. A process of claim 12, which comprises:

introducing chlorine gas simultaneous to at least one of steps (i), (ii), or (iii); and further comprises removing residual chlorine gas from the first, second, or third residual liquid.

14. A process as claimed in claim 12, which further comprises:

introducing an inert gas to at least one of the first, second, or third residual liquid.

15. A process as claimed in claim 4, which further comprises:

introducing chlorine gas to the first residual liquid or the second residual liquid.

16. A process as claimed in claim 4, which further comprises:

introducing chlorine gas to at least one of the first residual liquid, the second residual liquid, or the third residual liquid.

17. A process as claimed in any one of claims 10–12, which further comprises:

removing chlorine gas.

18. A process as claimed in claim 17, wherein said removing comprises bubbling an inert gas into a residual liquid and heating said residual liquid under reduced pressure.

19. A process as claimed in claim 17, further comprising:

transferring at least one of the first or second residual liquid to at least one of the second or third distillation column subsequent to removing chlorine gas.

20. A process as claimed in claim 18, further comprising:

transferring at least one of the first or second residual liquid to at least one of the second or third distillation column subsequent to removing chlorine gas.

21. A process as claimed in claim 17, further comprising:

transferring at least one of the first or second residual liquid to at least one of the second or third distillation column subsequent to removing chlorine gas.

22. A process as claimed in claim 18, further comprising:

transferring at least one of the first or second residual liquid to at least one of the second or third distillation column prior to removing chlorine gas.

23. A process as claimed in claim 4, wherein at least one of the separating steps (i), (ii), or (iii) occurs continuously.

24. A process of claim 4, wherein separating steps (i), (ii), and (iii) occur continuously and serially.

* * * * *